United States Patent
Smith et al.

(10) Patent No.: US 7,348,297 B2
(45) Date of Patent: Mar. 25, 2008

(54) TOPICAL DEFOAMER AND DEMULSIFIER

(75) Inventors: Kevin W. Smith, McMurray, PA (US); Joseph Miller, Aliquippa, PA (US); Larry W. Gatlin, Floresville, TX (US)

(73) Assignee: Clearwater International, L.L.C., Houston, TX (US)

( * ) Notice: Subject to any disclaimer, the term of this patent is extended or adjusted under 35 U.S.C. 154(b) by 378 days.

(21) Appl. No.: 10/959,666

(22) Filed: Oct. 5, 2004

(65) Prior Publication Data

US 2005/0049148 A1    Mar. 3, 2005

Related U.S. Application Data

(62) Division of application No. 10/223,258, filed on Aug. 19, 2002, now Pat. No. 6,806,234.

(60) Provisional application No. 60/313,606, filed on Aug. 20, 2001.

(51) Int. Cl.
    *C09K 8/035* (2006.01)

(52) U.S. Cl. ................. 507/132; 507/136; 507/245; 507/261

(58) Field of Classification Search ............. 507/136, 507/261, 262, 921
    See application file for complete search history.

(56) References Cited

U.S. PATENT DOCUMENTS

| | | | |
|---|---|---|---|
| 2,086,732 A | 7/1937 | Millar et al. | |
| 2,139,375 A | 12/1938 | Millar et al. | |
| 2,911,309 A | 11/1959 | Rudel et al. | |
| 3,684,734 A | 8/1972 | Liebold et al. | |
| 3,716,620 A | 2/1973 | Deschamps et al. | |
| 3,835,060 A | 9/1974 | Maddox et al. | |
| 4,125,382 A | 11/1978 | O'Brien et al. | |
| 4,225,456 A | 9/1980 | Schmidt et al. | |
| 4,234,435 A | 11/1980 | Meinhardt et al. | |
| 4,524,007 A | 6/1985 | Chibnik | |
| 4,814,094 A | 3/1989 | Blair et al. | |
| 5,362,894 A | 11/1994 | Handwerker et al. | |
| 5,403,822 A | 4/1995 | Mueller et al. | |
| 6,914,036 B2 * | 7/2005 | Spalding | 507/136 |

FOREIGN PATENT DOCUMENTS

CA     11228541    10/1987

OTHER PUBLICATIONS

P&G Ingredient Safety Information for C12-14 amine oxide, 2007, one page.*
International Search Report—Chem Abstr. vol. 69, No. 19, Nov. 1968. abstract No. 76574L.
International Preliminary Examination Report, dated Aug. 24, 2004, PCT/US02/26419, dated Aug. 19, 2002.
CA Office Action, Application No. 2,457,395, Dated May 23, 2006.
UK Examination Report under Section18(3) for Application GB402135.8 dated Dec. 3, 2004.

* cited by examiner

*Primary Examiner*—Robert Sellers
(74) *Attorney, Agent, or Firm*—Patterson & Sheridan, L.L.P.

(57) ABSTRACT

Compounds of the formula $H(CH_2)_zCOO—[C_2H_4O]_x C_yH_{2y+1}$ where z is 0-2, x is an integer from 1 to 5 and y is an integer from 4-9 are used as emulsion breakers and defoamers in formation treatment fluids in the recovery of hydrocarbons from subterranean formations. A preferred material has the formula $HCOO—[C_2H_4O]_3C_6H_7$.

20 Claims, No Drawings

TOPICAL DEFOAMER AND DEMULSIFIER

CROSS-REFERENCE TO RELATED APPLICATIONS

This application is a divisional of U.S. patent application Ser. No. 10/223,258, filed Aug. 19, 2002, now U.S. Pat. No. 6,806,234, which claims benefit of U.S. provisional patent application Ser. No. 60/313,606, filed Aug. 20, 2001. Each of the aforementioned related patent applications is herein incorporated by reference in their entirety.

BACKGROUND OF THE INVENTION

Alkyl ether organic acid esters are included in drilling and other formation treatment fluids used in hydrocarbon production to provide a demulsifying and defoaming action on foams and emulsions in the producing formation. The action of the compositions is time and temperature dependent and therefore their action can be controlled in situ.

In the production of hydrocarbons from the earth, drilling fluids and formation fracturing fluids are well known and come in many varieties. Where surfactants are included with the fluids, foaming is likely to occur, and frequently surfactants are added to generate foam to assist in removing the particulate products of drilling, or for other purposes. Emulsions may be added deliberately, but also they may be generated due to the pressure and mixing of the fluids with the target hydrocarbons. In most cases it is not desirable for emulsions to be formed in the formation with the hydrocarbons to be produced, since the emulsion will have to be broken after recovery in a separate, time-consuming step. Whether the emulsions are deliberately added or formed in situ, they may migrate under pressure into the pores of the subterranean formation, where they tend to seal the hydrocarbons which are the object of the production process.

A well-controlled method of breaking foams and emulsions in the formation is needed to produce hydrocarbons more efficiently.

SUMMARY OF THE INVENTION

We have developed compositions and methods for breaking both emulsions and foams in a subterranean hydrocarbon-bearing formation or a wellbore penetrating such a formation. The method comprises including with a drilling fluid or fracturing fluid (that is, a well treatment fluid) an alkyl ether organic ester of the formula $H(CH_2)_zCOO-[C_2H_4O]_xC_yH_{2y+1}$ where z is 0-2, x is 1-5 and y is 4-9, preferably where z is 0-1, x is 2-4, and y is 5-7, and most preferably where z is 0, x is 3, and y is 6—that is, most preferably where the compound is an alkyl ether formate of the formula $HCOO[C_2H_4O]_3C_6H_7$. The formation should have a temperature of at least 100° F. At temperatures of 100 degrees F. or over, the alkyl ether organic acid ester will hydrolyze to the organic acid and the ethoxylated alkyl alcohol, and act to reduce the foaming tendencies of the surfactants, at least partially by reducing the pH. It will also tend to break emulsions present through the action of the alcohol group on the etherified alkyl. Alternatively, the alkyl ether organic acid ester may be injected into the formation after the fracturing fluid.

DETAILED DESCRIPTION

Compounds of the formula $H(CH_2)_zCOO-[C_2H_4O]_xC_yH_{2y+1}$ where z is 0-2, x is 1-5 and y is 4-9 are believed to be novel compounds. They may be made by the simple esterification reaction of the corresponding hydroxy ethoxylated alkyl and organic acid. For example, the preferred compound $HCOO-[C_2H_4O]_3C_6H_7$ may be made by the reaction of formic acid with $C_6H_7OCH_2CH_2OCH_2CH_2OCH_2CH_2OH$. Preferably the reactants are heated and a slight excess of formic acid is used.

Our compositions and methods are not only effective for defoaming and demulsifying, but the dissociation products (particularly the ethoxylated alkyl alcohol) are more environmentally acceptable than a simple alcohol demulsifier. As a general rule, the demulsifying action is accelerated in time as Y is reduced in value in the above formula, but this tends to result in a product that may not be as environmentally benign as the larger alkyl groups. As the number of carbons is increased in the alkyl group (Y), the product becomes less soluble in water, adversely affecting the defoaming action. When we use the term "alkyl ether organic acid ester compound," and/or where we use the term "C6," it should be understood that we may substitute saturated and unsaturated (i.e. phenyl) cyclic moieties.

The following description of laboratory tests will illustrate the invention. For comparison, an emulsion was made utilizing 10% oil, 89% fresh water, and 1% of a commercial foamer/emulsifier comprising an amine oxide and an anionic surfactant. This was treated with a proposed emulsion breaker comprising octyl formate—that is, a compound of the formula $HCOOC_8H_9$, in concentrations ranging, in increments of 0.25% by weight, from 0.25% to 1% and at temperatures ranging, in increments of 25° F., from 100° F. to 200° F. Each sample was observed at 1, 2, 3, 4, 5 and 24 hours. A conclusion was drawn that the proposed breaker was generally ineffective at lower temperatures, lower concentrations and shorter times, and only moderately effective at the higher temperatures, higher concentrations and longer times. A similar series of tests was performed for the preferred breaker of the invention, having the formula $HCOO[C_2H_4O]_3C_6H_7$. At 100, 125, 150, 175 and 200° F., the emulsion broke on contact for the 0.50%, 0.75% and 1.0% solutions of breaker. The 0.25% breaker solution was effective but somewhat less efficient.

Also as a general rule, our alkyl ether organic acid ester compounds are effective when used in about a 1:1 molar ratio to the surfactants present in the fracturing or other well treatment fluid either as foaming or emulsifying agents. However, our alkyl ether organic acid ester compounds may be used in very small amounts, i.e. 1% of the content of the foaming agent, emulsifier, or surfactant in the formation fluid; they may be expected to be effective roughly to a corresponding degree. Amounts or concentrations of our material in excess of molar 1:1 may also be used, to very high multiples, but results will not be commensurate with the increased concentrations. We prefer not to use more than about three times the amount of surfactant, foaming agent, or emulsifier in the drilling or other well treatment fluid. A preferred amount of our novel well treatment compound will be in a molar ratio to surfactant in the formation fluid of 2:1 to 1:2. Likewise, it should be understood that our invention may be effective at formation temperatures lower than 100 degrees Fahrenheit, at a correspondingly retarded rate and effectiveness. The process is not recommended at temperatures below 90° F. for any variation of our composition. Temperatures may be considerably higher than 100° F., however. We are not aware of a subterranean temperature above which our compositions will be ineffective for the purposes described.

Our invention is especially useful where the hydrocarbons to be removed from the subterranean formation contain more than about 0.01% by weight paraffins or waxes containing more than 19 carbon atoms, particularly in the lower temperature ranges.

The invention claimed is:

1. Method of controlling foaming or emulsifying in a subterranean formation treatment fluid in a subterranean hydrocarbon-producing formation comprising including in said formation treatment fluid at least 1% by weight of the foaming or emulsifying constituent therein of a compound of the formula $H(CH_2)_zCOO\text{—}[C_2H_4O]_xC_yH_{2y+1}$, or of the formula $H(CH_2)_zCOO\text{—}[C_2H_4O]_xC_6H_5$, where z is 0-2, x is an integer from 1 to 5 and y is an integer from 4-9, wherein the foaming or emulsifying constituent comprises an amine oxide.

2. Method of claim 1 wherein said subterranean hydrocarbon producing formation contains more than about 0.01% by weight, based on the hydrocarbons to be removed, paraffins or waxes having more than 19 carbon atoms.

3. Method of claim 2 wherein the subterranean formation is at a temperature of at least 100 degrees Fahrenheit.

4. Method of claim 1 wherein z is 0-1, x is 2-4, and y is 5-7.

5. Method of claim 1 wherein z is 0, x is 3, and y is 6.

6. Method of claim 1 wherein said compound of the formula $H(CH_2)_zCOO\text{—}[C_2H_4O]_xC_yH_{2y+1}$ is present in a molar ratio 2:1 to 1:2 to said foaming or emulsifying constituent.

7. Method of claim 1 wherein said foaming or emulsifying constituent comprises an anionic surfactant.

8. A method of controlling foaming or emulsifying in a subterranean formation treatment fluid having a surfactant in a subterranean hydrocarbon-producing formation, comprising:

adding a defoaming or demulsifying compound of the formula $H(CH_2)_zCOO\text{—}[C_2H_4O]_x C_yH_{2y+1}$ or of the formula $H(CH_2)_zCOO\text{—}[C_2H_4O]_xC_6H_5$, where z is an integer from 0 to 2, x is an integer from 1 to 5, and y is an integer from 4 from 9, wherein the defoaming or demulsifying compound is present in a molar ratio 2:1 to 1:2 to the surfactant.

9. The method of claim 8, wherein the subterranean hydrocarbon producing formation contains more than about 0.01% by weight, based on the hydrocarbons to be removed, paraffins or waxes having more than 19 carbon atoms.

10. The method of claim 9, wherein the subterranean formation is at a temperature of at least 100 degrees Fahrenheit.

11. The method of claim 8, wherein z is 0-1, x is 2-4, and y is 5-7.

12. The method of claim 8, wherein z is 0, x is 3, and y is 6.

13. The method of claim 8, wherein the surfactant comprises an amine oxide.

14. The method of claim 8, wherein the surfactant comprises an anionic surfactant.

15. The method of claim 8, wherein the defoaming or demulsifying compound is added after the formation fracturing fluid is supplied into the formation.

16. The method of claim 8, wherein the formation treatment fluid comprises fracturing fluid.

17. The method of claim 8, wherein a pH of the formation treatment fluid is reduced after the defoaming or demulsifying compound is added.

18. The method of claim 1, wherein the compound is effective to break a foam or emulsion made by the amine oxide.

19. The method of claim 1, wherein the compound reduces a foam made by the amine oxide by reducing the pH.

20. The method of claim 8, wherein the compound is effective to break a foam or emulsion made by the surfactant.

* * * * *